Figure 1:
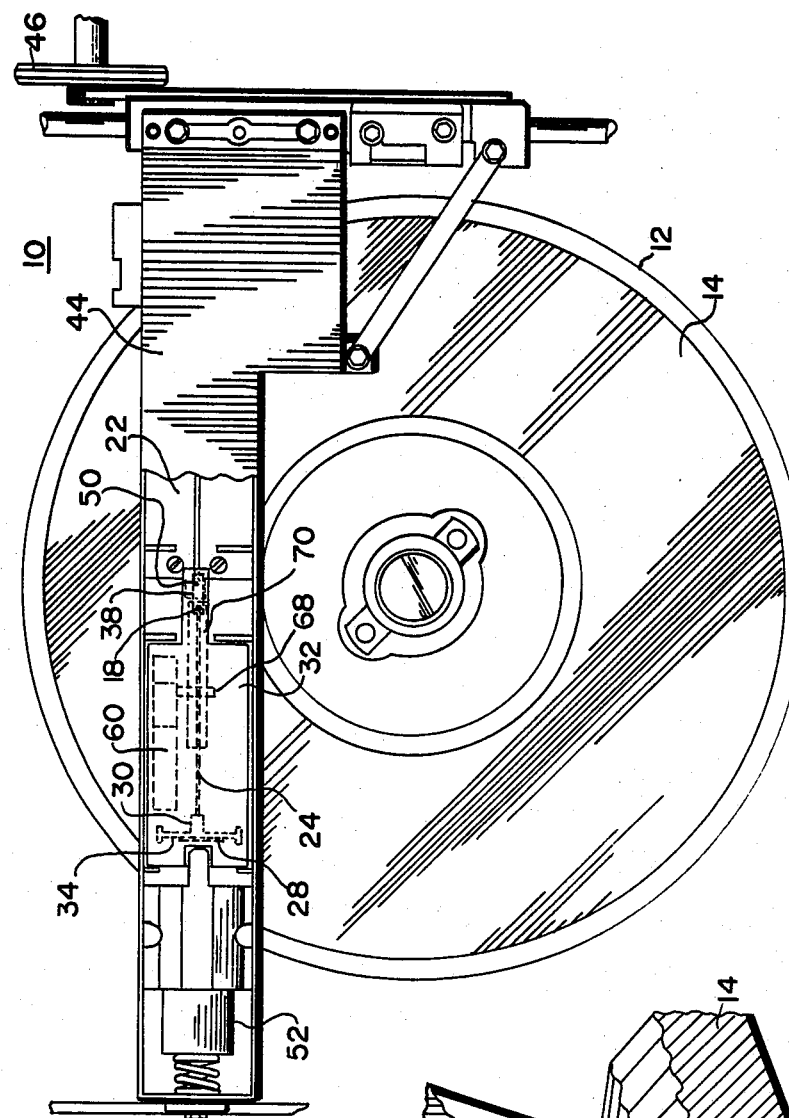

United States Patent [19]

Stewart

[11] 4,364,121
[45] Dec. 14, 1982

[54] PICKUP CARTRIDGE FOR VIDEO DISC PLAYER

[75] Inventor: Myron C. Stewart, Coatesville, Ind.
[73] Assignee: RCA Corporation, New York, N.Y.
[21] Appl. No.: 222,416
[22] Filed: Jan. 5, 1981
[51] Int. Cl.³ .............................................. G11B 25/04
[52] U.S. Cl. ...................................................... 369/256
[58] Field of Search ................. 369/256, 224, 77, 244; 16/110 R, 114 R, 114 B, 124, 125; 358/128

[56] References Cited

U.S. PATENT DOCUMENTS

| | | | |
|---|---|---|---|
| 2,401,664 | 6/1946 | Robins | 16/114 R |
| 3,016,136 | 1/1962 | Poupitch | 16/124 X |
| 3,952,145 | 4/1976 | Allen | 369/256 X |
| 4,038,682 | 7/1977 | Allen | 369/256 X |

FOREIGN PATENT DOCUMENTS 797641 7/1958 United Kingdom.

Primary Examiner—Harry N. Haroian
Attorney, Agent, or Firm—E. M. Whitacre; J. S. Tripoli; D. A. Kulkarni

[57] ABSTRACT

A pickup cartridge is received in a compartment provided in a translatable carriage of a video disc player. The spacing between the cartridge and the compartment walls is such that access to the cartridge is not permitted while the cartridge is contained therein. A grasp tab is disposed on the top wall of the cartridge to allow installation (and subsequent removal) of the cartridge into the carriage compartment.

5 Claims, 6 Drawing Figures

PICKUP CARTRIDGE FOR VIDEO DISC PLAYER

This invention generally relates to a pickup cartridge, and more particularly, to a pickup cartridge handling means.

In certain playback systems, video information is stored on a high density disc record in the form of geometric variations in a continuous spiral track disposed on the record surface. The variations in capacitance between an electrode carried by a record-engaging stylus and a conductive property of the record are sensed to reproduce the stored information. An illustrative capacitance video disc player is disclosed in U.S. Pat. No. 3,842,192 (Clemens).

Playback of disc records having high groove densities (e.g., of the order of 10,000 groove convolutions per inch) requires a pickup stylus having very fine dimensions (e.g., stylus width—2.5 micrometers). The stylus is housed in a pickup cartridge to protect it from damage during handling and shipping. The pickup cartridge is, in turn, installed in a compartment provided in a carriage which is translatably mounted in the record player. During playback, the carriage is driven to follow the radial motion of the track-following pickup stylus.

The stylus/record capacitance forms a part of a tuned circuit, the resonant frequency of which is varied in accordance with the prerecorded signals disposed on the record. The tuned circuit is energized by an RF source (e.g., having an excitation frequency—915 MHz), and the response of the tuned circuit is detected. The detected information is converted into video and audio signals suitable for reproduction on a standard television receiver. The signal pickup circuitry, coupled to the stylus electrode, is housed in the carriage. Reference is made to Kawamoto, et al. (U.S. Pat. No. 4,080,625) for a description of an illustrative pickup circuitry of this type.

The carriage compartment is equipped with a door for providing access to the pickup cartridge. The cartridge compartment and the access door are provided with a conductive property for confining the RF energy to the compartment. The top edges of the compartment side walls are continuous and subject to engagement with the underside of the access door, when the door is closed, to reduce Rf energy leakage. The spacing between the side walls of the compartment and the cartridge is such that grasping of the cartridge directly with human fingers is not easily accomplished.

In accordance with this invention, the cartridge is provided with a handling means disposed on the top surface thereof, which facilitates proper placement (and subsequent removal) of the cartridge into the carriage compartment when the access door is opened.

Figure 2:
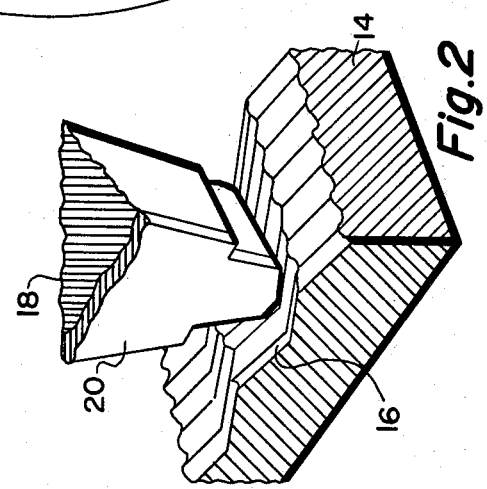
Figure 3:
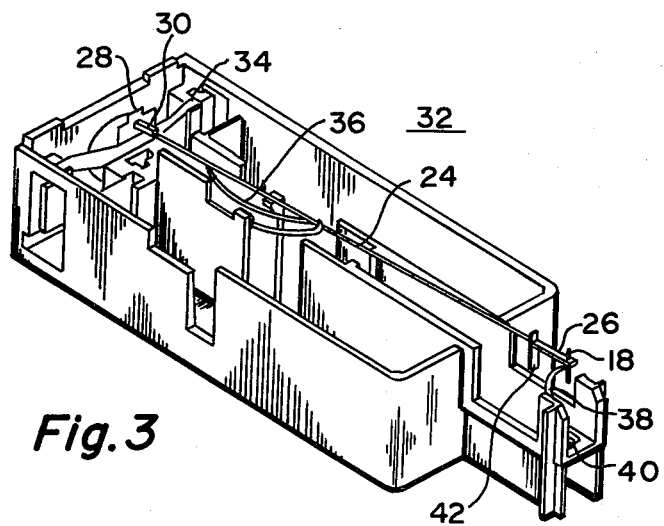
Figure 5:
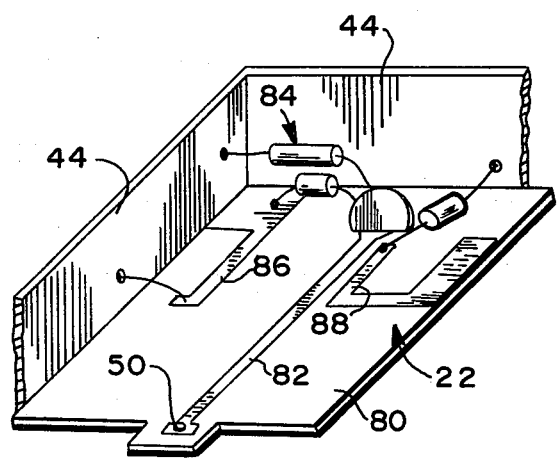
Figure 4:
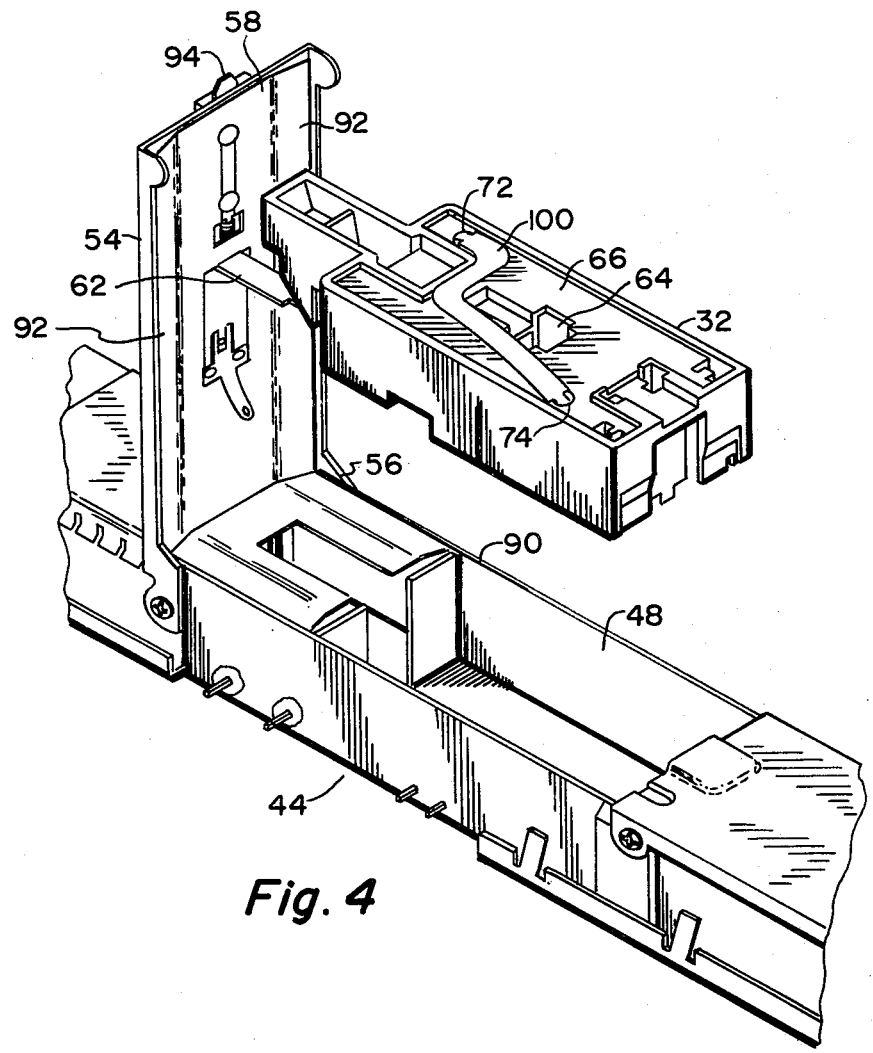
Figure 6:
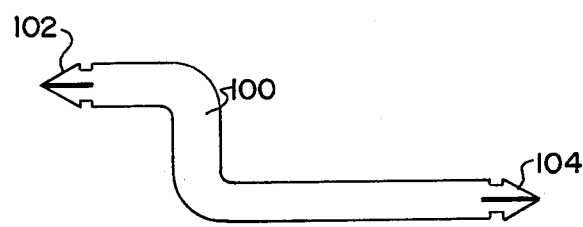

In the Drawings:

FIG. 1 diagrammatically illustrates a capacitance video disc player having a slidably-mounted carriage with a compartment for receiving a pickup cartridge equipped with a handling means in accordance with the subject invention;

FIG. 2 schematically represents the capacitance pickup concept involving a pickup stylus carrying an electrode and a disc record with a conductive property;

FIG. 3 depicts the instant pickup cartridge turned upside down to expose the underlying details; FIG. 4 is a fragmentary exploded perspective view of the carriage and the subject pickup cartridge; FIG. 5 shows a portion of pickup circuitry, coupled to the stylus electrode, for detecting prerecorded signals provided on a disc record during playback; and FIG. 6 illustrates the handling means attached to the subject cartridge pursuant to this invention.

FIG. 1 diagrammatically illustrates a video disc player 10 having a turntable 12 for rotatably supporting a disc record 14. A motor drives the turntable to rotate at proper speed. U.S. Pat. No. 3,912,283, issued to Hammond et al., describes an illustrative turntable drive system. Video signals are recorded, as schematically shown in FIG. 2, in the form of undulations in the bottom of a smooth spiral groove 16 disposed on the disc record 14 molded from conductive plastic material. An illustrative conductive plastic composition is disclosed in U.S. Pat. No. 4,228,050 issued to Martin et al. A pickup stylus 18 incorporates a conductive electrode 20 which forms a signal representative capacitance with the record conductive material when the stylus is lowered on the record for playback. The signal representative capacitance varies in accordance with the signals recorded on the disc as stylus/record relative motion is established. The player employs a printed pickup circuit 22 responsive to the signal representative capacitance variations for reconstructing recorded signals.

The pickup stylus 18 is secured to the free end of a stylus arm 24 by means of a stylus holder 26 in the manner shown in FIG. 3.

The other end of the stylus arm 24 is secured to a connector plate 28 by means of a compliant coupler 30. The connector plate 28 is suspended in a pickup cartridge 32 by means of a flexible diaphrogm 34. A U-shaped spring 36 serves to retain the delicate stylus assembly within the confines of the cartridge 32 during storage and handling. A conductive leaf spring 38 (i.e., flylead) connects the pickup electrode 20 to a terminal 40 on the cartridge 32. An extension 42 is disposed on the stylus holder 26 for constraining side-to-side excursions of the stylus 18.

The player includes a conductive arm carriage 44 which is subject to translation along a path disposed radially of the disc record 14 placed on the turntable 12. As shown schematically in FIG. 1, a variable speed, DC motor causes translation of the carriage at an appropriate speed via a gear box 46.

As illustrated in FIG. 4, the carriage 44 is provided with a compartment 48 for removably receiving the pickup cartridge 32. Placement of the cartridge 32 in the carriage compartment 48 establishes electrical contact between the cartridge terminal 40 and a terminal 50 of the pickup circuit 22. Mounted in the carriage 44 is an armstretcher apparatus 52. When the cartridge 32 is installed in the carriage compartment 48 and a conductive lid 54 of the carriage is closed, a mechanism 56, responsive to the lid movement, pushes the armstretcher toward the cartridge to effect mechanical engagement between the cartridge connector plate 28 and a translatable support disposed on the armstretcher. The armstretcher 52 imparts translatory motion to the stylus in a manner that opposes cyclical deviations in the stylus/record relative velocity during playback. The lid 54 is provided with a conductive shield 58 for containing RF radiation in the manner described subsequently. U.S. Pat. No. 3,983,318 (Miller) describes an illustrative armstretcher apparatus.

Also disposed in the carriage is a stylus arm lifting/lowering apparatus 60. The lifting/lowering apparatus 60 serves (1) to gently lower the pickup stylus 18 on the record 14 for playback, (2) to lift the stylus away from the record in the pause mode of the player, and (3) to raise the stylus for allowing it to clear the record bead as the carriage moves from an off-record rest position to an on-record play position. When the lid 54 is closed, an extension 62 disposed thereon enters the cartridge body through an opening 64 provided in the top wall 66 thereof to defeat the stylus arm retaining spring 36, permitting the stylus arm 24 to rest on a support member 68 of the lifting/lowering apparatus. The bottom wall of the carriage has an opening 70 through which the pickup stylus 18 is lowered for playback. The cartridge 32 is equipped with a pair of pilot holes 72 and 74 for facilitating the mechanized handling of the cartridge during cartridge assembly operations. Reference is made to U.S. Pat. No. 4,053,161 (Bleazey) for a more detailed description of an illustrative stylus arm lifting/lowering apparatus.

The operation of the printed pickup circuit 22 will now be explained in conjunction with FIG. 5. The pickup circuit 22 comprises a dielectric substrate 80 bearing a conductive coating in several elongated surface regions to define a plurality of substantially parallel conductors. Upon reception of the cartridge 32 in the carriage compartment 48, electrical contact is established between the cartridge terminal 40 and the terminal 50 disposed at one end of a first conductor 82. A multiple of capacitive elements 84 couple the other end of the first conductor 82 to the carriage 44. The flylead 38 and the first conductor 82 form a transmission line in cooperation with the conductive carriage 44. The transmission line is capacity end loaded at each end: (a) at one end, by the varying stylus/record capacitance as groove bottom geometry variations pass beneath the stylus, and (b) at the other end, by the capacitive elements 84. A tuned circuit, formed by the end-loaded transmission line, has a resonant frequency which is subject to variation over a range of frequencies in response to the stylus/record capacitance variations. A source of UHF oscillations, desirably of frequency (e.g., 915 MHz) within the ISM band, is mounted in the carriage 44, and coupled to a second conductor 86, lying in a spaced, substantially parallel relationship to the first conductor 82, for inductively coupling the UHF oscillations to the transmission line. The location of the tuning range center (e.g., 910 MHz) is slightly shifted from the UHF source frequency, so that the source frequency falls on a slope (e.g., upper slope) of the resonance curve, and effectively moves up and down along the slope as the stylus/record capacitance varies.

As the stylus/record capacitance varies, the resonant frequency of the tuned circuit moves toward and away from the source frequency, altering the tuned circuit response to the source oscillations, and thus varying the amplitude of the oscillations inductively coupled to a third conductor 88, also lying in a spaced, substantially parallel relationship to the first conductor 82. The envelope of the amplitude modulated UHF oscillations is detected by the operation of a diode detector (not shown) housed in the carriage 44 and linked to the third conductor 88. The detector output is coupled to suitable circuitry for conversion to video and audio signals appropriate for reproduction on a standard television receiver. Reference is made to the afore-mentioned Kawamoto et al. patent (U.S. Pat. No. 4,080,625) for a detailed disclosure of an illustrative pickup circuit.

In such systems, it is desirable to contain RF radiation within the carriage 44 to prevent possible interference with nearby electronic equipment. To this end, the carriage 44 and the lid 54 are provided with a conductive property for restricting the RF energy leakage. The top edges of the compartment side walls 90 are continuous, and dimensioned to contact the shield 58 disposed on the underside of the lid 54, when the lid is closed, to further reduce the RF energy loss. The side edges 92 of the shield 58 are spring-loaded to assure a good engagement between the top edges of the side walls 90 and the shield when the lid 54 is closed. The lid 54 is provided with a latch 94 to lock the lid in place upon closure. The spacing between the compartment side walls 90 and the peripheral walls of the cartridge 32 is such that the grasping of cartridge directly with human fingers is precluded.

In accordance with this invention, a grasp tab 100, shown in FIG. 6, is attached to the top wall 66 of the cartridge 32 in the manner shown in FIG. 4. The grasp tab 100 comprises a die cut strip of a polyester film (e.g., Mylar). The configuration of the grasp tab 100 is such that it clears the opening 64 in the top wall 66 of the cartridge through which the extension 62 disposed on the lid 54 enters to defeat the stylus arm retaining spring 36. Each end of the grasp tab 100 has an arrowhead shape. The arrowhead ends 102 and 104 of the grasp tab 100 are threaded through the pilot holes 72 and 74 disposed in the top wall 66 of the cartridge 32 to secure the grasp tab to the cartridge. The arrowhead ends 102 and 104 of the grasp tab 100 are slit, in the manner shown in FIG. 6, to facilitate the insertion of the grasp tab ends into the pilot holes 72 and 74. The dimension of the grasp tab 100 with respect to the spacing between the pilot holes 72 and 74 is such that the grasp tab is upwardly bowed to allow grasping thereof with human fingers.

What is claimed is:

1. A cartridge for use with a video disc player for recovering prerecorded signals disposed on a disc record by means of a pickup device; said pickup device being housed in said cartridge; said cartridge having a top surface and a plurality of peripheral surfaces; said player including a translatable carriage having a compartment for housing said cartridge; said carriage compartment having a bottom wall with an aperture through which said pickup device extends for record engagement, and side walls for enclosing said cartridge; said carriage compartment further having a cartridge access door subject to disposition in an open position and a closed position; said carriage further housing a source of RF energy coupled to said pickup device for sensing said prerecorded signals; said walls of said cartridge compartment and said access door having a conductive property for substantially confining said RF energy to said compartment; the top edges of said side walls of said cartridge compartment being continuous and subject to engagement with the underside of said access door, when said access door is closed, to reduce RF energy leakage; the spacing between said top edges of said side walls of said cartridge compartment and the periphery of said cartridge, upon its reception in said compartment, being such that the grasping of said peripheral surfaces of said cartridge directly with human fingers is precluded; said cartridge having handling means disposed on said top surface thereof for facilitating placement and removal of said cartridge into and from said compartment when said access door is opened; said cartridge handling means comprising a substantially planar flexible strip having its ends attached to said top surface of said cartridge.

2. Cartridge as defined in claim 1 wherein said cartridge has a pair of pilot holes for facilitating mechanized handling of said cartridge during cartridge assembly operations; wherein each of said ends of said strip has an arrowhead configuration; wherein said arrowhead ends of said strip are threaded through said pilot holes to provide said attachment.

3. Cartridge as defined in claim 2 wherein said arrowhead ends of said strip are slit to ease the insertion of said ends through said pilot holes to achieve said attachment.

4. Cartridge as defined in claim 1 wherein said strip comprises a die cut strip of a polyester film.

5. Cartridge as defined in claim 1 wherein the dimension of said strip relative to the spacing between said pilot holes is such that said strip is upwardly bowed to facilitate grasping thereof with human fingers.

* * * * *

UNITED STATES PATENT AND TRADEMARK OFFICE
CERTIFICATE OF CORRECTION

PATENT NO. : 4,364,121
DATED : December 14, 1982
INVENTOR(S) : Myron C. Stewart

It is certified that error appears in the above—identified patent and that said Letters Patent is hereby corrected as shown below:

Col. 1, Line 15:

"Pat. No. 3,842,192" should be - Pat. No. 3,842,194 -.

Col. 1, Line 66:

"FIG. 4" should begin new paragraph.

Col. 1, Line 68:

"FIG. 5" should begin new paragraph.

Col. 2, Line 32:

"diaphrogm" should be - diaphragm -.

Signed and Sealed this

Twenty-ninth Day of March 1983

[SEAL]

Attest:

GERALD J. MOSSINGHOFF

Attesting Officer      Commissioner of Patents and Trademarks